US011951500B2

(12) United States Patent
Quinn

(10) Patent No.: US 11,951,500 B2
(45) Date of Patent: Apr. 9, 2024

(54) SHOWERHEAD WITH FEEDBACK ASSEMBLY

(71) Applicant: WATER PIK, INC., Fort Collins, CO (US)

(72) Inventor: Michael J. Quinn, Windsor, CO (US)

(73) Assignee: Water Pik, Inc., Fort Collins, CO (US)

(*) Notice: Subject to any disclaimer, the term of this patent is extended or adjusted under 35 U.S.C. 154(b) by 352 days.

(21) Appl. No.: 17/481,133

(22) Filed: Sep. 21, 2021

(65) Prior Publication Data

US 2023/0085999 A1 Mar. 23, 2023

(51) Int. Cl.

*B05B 15/62* (2018.01)
*B05B 1/18* (2006.01)
*E03C 1/04* (2006.01)
*E03C 1/06* (2006.01)

(52) U.S. Cl.

CPC ................ *B05B 15/62* (2018.02); *B05B 1/18* (2013.01); *E03C 1/0409* (2013.01); *E03C 1/06* (2013.01)

(58) Field of Classification Search

CPC ......... B05B 15/62; B05B 1/18; F03C 1/0409; F03C 1/06

See application file for complete search history.

(56) References Cited

U.S. PATENT DOCUMENTS 3,266,764 A 8/1966 Briles
D206,515 S 12/1966 Isenberg
3,826,454 A 7/1974 Zieger
3,837,013 A 9/1974 Davis et al.
4,458,369 A 7/1984 Santi
5,339,469 A 8/1994 Gilles
(Continued)

FOREIGN PATENT DOCUMENTS

CN 203404452 1/2014
CN 104759360 7/2015
(Continued)

OTHER PUBLICATIONS

Waterpik QMK-759ME Shower head. Amazon Standard IdD190 BOBMKFDTQ2. Catalogue [Online]. Amazon.com 2022. [Earliest Review Date: Nov. 15, 2022][Retrieved on Jun. 5, 2023]. Retrieved from the Internet: <URL:https://www.amazon.com/ Waterpik-Magnetic-Adjustable-PowerPulse-QM K-7 59 M E/dp/B0 Bm KFDTQ2> (Year: 2022).

*Primary Examiner* — Jeremy Carroll

(57) ABSTRACT

A showerhead assembly including a handheld showerhead and a mounting bracket configured to be fluidly coupled to a water source. One of the handheld showerhead and the mounting bracket includes a magnet or a magnetically attractable material, and the other of the handheld shower-head and the mounting bracket includes a magnet or a magnetically attractable material. The magnet of the one of the handheld showerhead or the mounting bracket, or the magnet or the magnetically attractable material of the other of the handheld showerhead or the mounting bracket, is moveable relative to the handheld showerhead or the mounting bracket to which it is included by attraction of the magnet of the one of the handheld showerhead and the mounting bracket to the magnet or the magnetically attractable material of the other of the handheld showerhead and the mounting bracket.

21 Claims, 7 Drawing Sheets

(56) References Cited

U.S. PATENT DOCUMENTS

| | | | | |
|---|---|---|---|---|
| D626,196 | S | 10/2010 | Gilbert | |
| D626,197 | S | 10/2010 | Gilbert | |
| D656,222 | S | 3/2012 | Su | |
| D662,175 | S | 6/2012 | Flowers et al. | |
| D662,176 | S | 6/2012 | Flowers et al. | |
| 8,191,185 | B2 * | 6/2012 | Tsai | E03C 1/06 4/615 |
| 8,919,379 | B2 * | 12/2014 | Zhou | E03C 1/0408 137/625.48 |
| 9,919,331 | B2 | 3/2018 | Scheffer et al. | |
| 10,046,341 | B2 | 8/2018 | Wu et al. | |
| 10,150,121 | B2 | 12/2018 | Lin et al. | |
| 10,189,030 | B2 | 1/2019 | Mirkov | |
| 10,232,384 | B2 | 3/2019 | Hawkins | |
| D861,129 | S | 9/2019 | Logar | |
| D864,350 | S | 10/2019 | Logar | |
| 10,537,904 | B2 | 1/2020 | Lin et al. | |
| 10,618,065 | B2 | 4/2020 | Lin et al. | |
| 10,661,284 | B2 | 5/2020 | Lin et al. | |
| D889,602 | S | 7/2020 | Wu | |
| D889,603 | S | 7/2020 | Wu | |
| 10,738,443 | B1 | 8/2020 | Smith et al. | |
| 10,821,449 | B2 | 11/2020 | Lin et al. | |
| 11,371,225 | B2 | 6/2022 | Lin et al. | |
| D960,301 | S | 8/2022 | Ketterling | |
| 2013/0032647 | A1 * | 2/2013 | Zhou | B05B 1/1654 239/562 |
| 2016/0236223 | A1 * | 8/2016 | Scheffer | E03C 1/06 |
| 2016/0303581 | A1 | 10/2016 | Li et al. | |
| 2018/0104707 | A1 * | 4/2018 | Lin | B05B 1/1609 |
| 2018/0193851 | A1 | 7/2018 | L'Henaff et al. | |
| 2019/0083991 | A1 | 3/2019 | Lin et al. | |
| 2019/0142147 | A1 * | 5/2019 | Quinn | A46B 11/066 4/606 |
| 2019/0176170 | A1 | 6/2019 | Lee et al. | |
| 2019/0299224 | A1 | 10/2019 | Wu et al. | |
| 2019/0323214 | A1 | 10/2019 | Wang et al. | |
| 2019/0351444 | A1 | 11/2019 | Berlovan, Jr. et al. | |
| 2020/0156090 | A1 | 5/2020 | Lin et al. | |
| 2020/0360955 | A1 | 11/2020 | Huang | |
| 2021/0053083 | A1 | 2/2021 | Zhuo et al. | |
| 2021/0060598 | A1 * | 3/2021 | Lee | E03C 1/06 |
| 2021/0198877 | A1 | 7/2021 | Wu et al. | |
| 2021/0246640 | A1 | 8/2021 | Hu et al. | |
| 2022/0126310 | A1 | 4/2022 | Dai et al. | |
| 2023/0085999 | A1 | 3/2023 | Quinn | |
| 2023/0158535 | A1 | 5/2023 | Ni et al. | |
| 2023/0257974 | A1 | 8/2023 | Wang et al. | |

FOREIGN PATENT DOCUMENTS

| | | | |
|---|---|---|---|
| CN | 207343069 | | 5/2018 |
| CN | 207413642 | | 5/2018 |
| CN | 304946951 | S | 12/2018 |
| CN | 208554775 | | 3/2019 |
| CN | 210994956 | | 7/2020 |
| CN | 111495653 | | 8/2020 |
| CN | 212943680 | | 4/2021 |
| CN | 213539173 | | 6/2021 |
| EP | 1033931 | | 3/2004 |
| EP | 3411535 | | 12/2018 |
| GB | 2492700 | | 7/2013 |
| JP | 4271543 | | 6/2009 |
| KR | 20120090416 | | 8/2012 |
| WO | 200032317 | | 6/2000 |

* cited by examiner

SHOWERHEAD WITH FEEDBACK ASSEMBLY

TECHNICAL FIELD

One or more embodiments of the present disclosure relate generally to showerheads, and more specifically, to showerheads attached to a bracket, such as handheld showerheads.

BACKGROUND

Showerheads are often attached to a plumbing fixture, such as a J-pipe, in a bathroom via a bracket. Some brackets allow a user to remove the showerhead from the bracket, such as to focus the showerhead spray on a select portion of the body. As a user acts to return the showerhead to the bracket, the user may have a difficult time connecting the showerhead to the bracket, especially in a wet environment where the user may have soap or shampoo in his or her eyes. As such, there is a need for a showerhead that provides feedback to the user regarding the positioning of the showerhead relative to the bracket. Additionally or alternatively, showerheads may be used by multiple users, e.g., different family members, each of which may have a different height or otherwise prefer a particular spray height when the showerhead is connected to the bracket. Conventionally, many showerheads may be limited in the mount positions, limiting the options available for adjustment.

SUMMARY

According to one or more embodiments of the present disclosure, a showerhead assembly including a handheld showerhead and a mounting bracket configured to be fluidly coupled to a water source is disclosed. One of the handheld showerhead and the mounting bracket includes a magnet or a magnetically attractable material, and the other of the handheld showerhead and the mounting bracket includes a magnet or a magnetically attractable material. The magnet of the one of the handheld showerhead or the mounting bracket, or the magnet or the magnetically attractable material of the other of the handheld showerhead or the mounting bracket, is moveable relative to the handheld showerhead or the mounting bracket to which it is included by attraction of the magnet of the one of the handheld showerhead and the mounting bracket to the magnet or the magnetically attractable material of the other of the handheld showerhead and the mounting bracket.

According to embodiments of the present disclosure, a showering system is disclosed. The showering system may include a handheld showerhead including a mounting feature and a showerhead feedback element; a mounting bracket configured to support the handheld showerhead comprising a bracket feedback element, wherein the showerhead feedback element interacts with the bracket feedback element at a select distance and orientation to generate an audible feedback.

According to one or more embodiments of the present disclosure, a showerhead assembly is disclosed that includes a showerhead and a mounting bracket comprising a bracket mounting assembly, the mounting bracket configured to be coupled to a support structure. The showerhead mounting assembly engages the bracket mounting assembly to support the showerhead in two different positions relative to the bracket, where the showerhead mounting assembly and the bracket mounting assembly are configured to define a spray area sufficiently spaced apart from the support structure to allow a user to be fully wetted by a spray from the showerhead in both of the two positions One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the showerhead described herein and should not be construed as a complete depiction of the scope of the oral cleansing device.

Embodiments of the disclosure and their advantages are best understood by referring to the detailed description that follows. It should be appreciated that like reference numerals may be used to identify like elements illustrated in one or more of the figures.

DETAILED DESCRIPTION

Figure 1A:
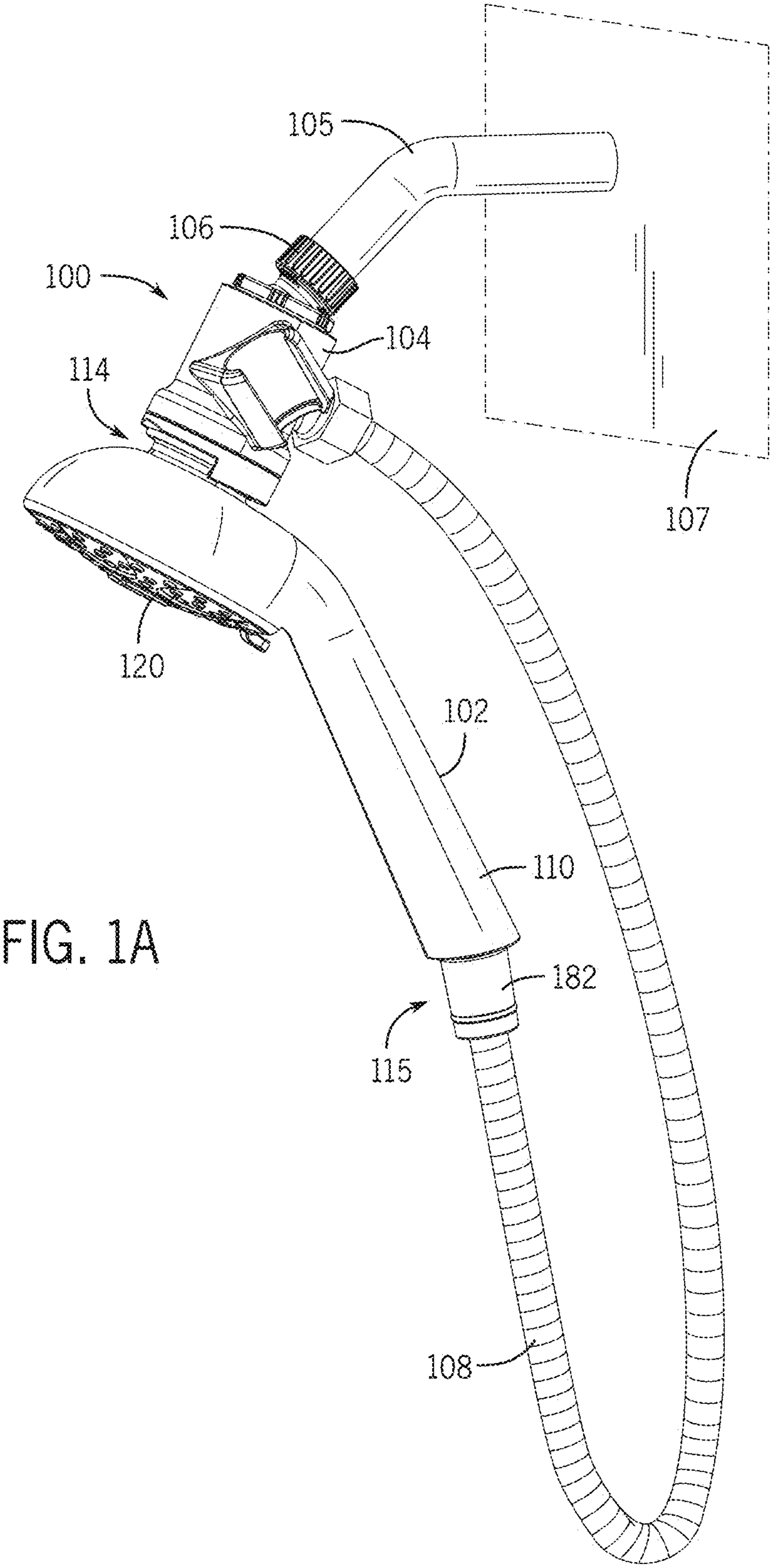
FIG. 1A is a front isometric showerhead system with a showerhead in a first position in accordance with an embodiment of the disclosure.

Embodiments of the present disclosure relate to a showerhead system that provides feedback to a user as a showerhead is mounted onto a bracket. The feedback can provide guidance to the user that the showerhead is aligned properly with the bracket for mounting. The feedback may be audible, such that a user can receive the feedback even with his or her eyes closed. The showerhead and bracket may each include feedback elements, such as a magnetic or magnetically attractable material, that interact with each other. For example, the showerhead may include a stationary feedback element that interacts with a movable feedback element within the bracket, such that as the showerhead moves close to the bracket, the stationary feedback element pulls the movable feedback element from a first position to a second position. In the second position, the movable feedback element may contact a wall or other structure, generating an audible noise, such as a "click." This alerts the user that the showerhead is positioned properly relative to the bracket for mounting the showerhead to the bracket. As the mounting is completed, the movable feedback element may be moved in a controlled manner back to the first position.

The feedback elements may interact via an attractive force that further acts as feedback to the user, as well as physically assists in aligning the showerhead with the bracket. For example the user may feel via the showerhead, the attractive force, which can act to "home in" the showerhead on the bracket. The interaction force may not be sufficient to retain the showerhead on the bracket, rather a mechanical mounting feature may be used to support the showerhead on the bracket. The mechanical mounting feature may allow a user to easily mount and unmount the showerhead, while providing a secure connection between the showerhead and the bracket to prevent unintended (e.g., accidental) removal of the showerhead from the bracket, such as when a user contacts a hose associated with a handheld showerhead. As another example, the mechanical mounting feature may support high flow rates through the showerhead that may not be possible with a purely magnetic connection.

In some embodiments, the bracket may include two separate mounting features that orient the showerhead at two different positions, e.g., low and high positions. The dual mounting features allow multiple users with different preferences to utilize the same shower. In one example, a first mounting feature may be defined as a ledge that extends from a front surface of the mounting bracket and may position the showerhead in the first position and a second mounting feature may be defined as a clamp or cradle that extends from a side surface of the mounting bracket and is configured to position the showerhead in the second position. As can be appreciated, the first mounting feature may engage with a first mounting feature on the showerhead (e.g., a protruding flange) and the second mounting feature may engage with a second mounting feature on the showerhead (e.g., a hose coupler). The bracket and showerhead may be configured such that in either the first position or the second position a spray area of the showerhead may be sufficiently spaced to allow full range of the water spray to impact a user in the shower environment. For example, the spray area may be spaced apart from a mounting surface sufficiently to allow a user to be positioned beneath the full spray area and be fully wetted in either the first or second positions.

Figure 1B:
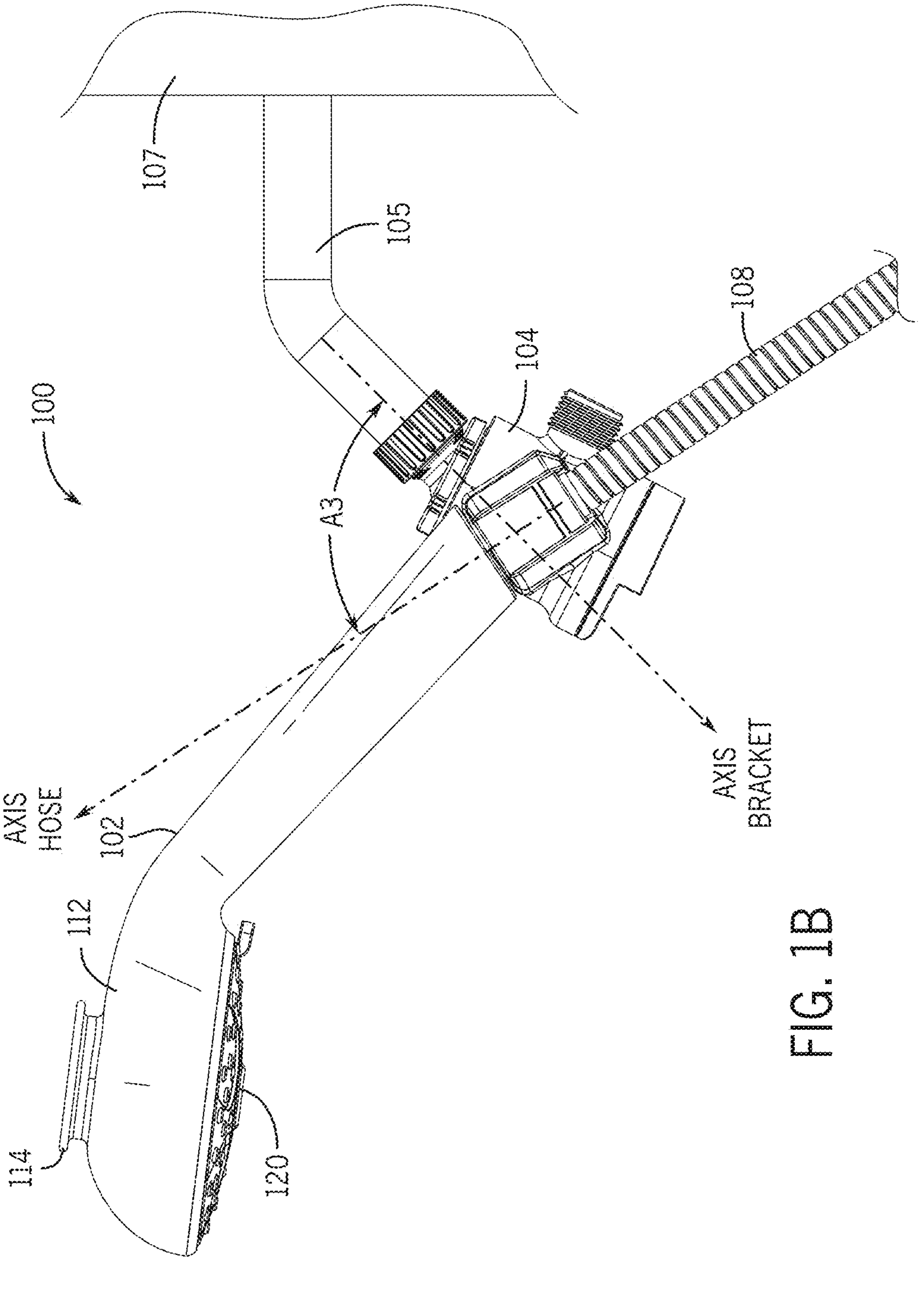
FIG. 1B is a side elevation view of the showerhead system with a showerhead in a second position in accordance with an embodiment of the disclosure.

FIG. 1A illustrates an isometric view of a showerhead assembly or system 100 with a showerhead in a first position. FIG. 1B illustrates a side elevation view of the showerhead assembly with the showerhead in a second position. With reference to FIGS. 1A and 1B, the showerhead assembly 100 may include a showerhead 102 and a mounting bracket 104. The showerhead 102 is fluidly coupled to the mounting bracket 104 by a hose 108 and the mounting bracket 104 may be fluidly coupled to a water outlet 105, such as a J-pipe or other pipe, and may be structurally mounted to a support 107, such as a wall or other structural element (e.g., faucet mounted pipe) within a shower environment. In some embodiments, a pivot ball 106 may be coupled to the mounting bracket 104 to allow the mounting bracket 104 to be movably coupled to the J-pipe or other water outlet 105, e.g., the mounting bracket 104 can be pivoted to different angular positions relative to the water outlet 105 and support 107.

Figure 2A:
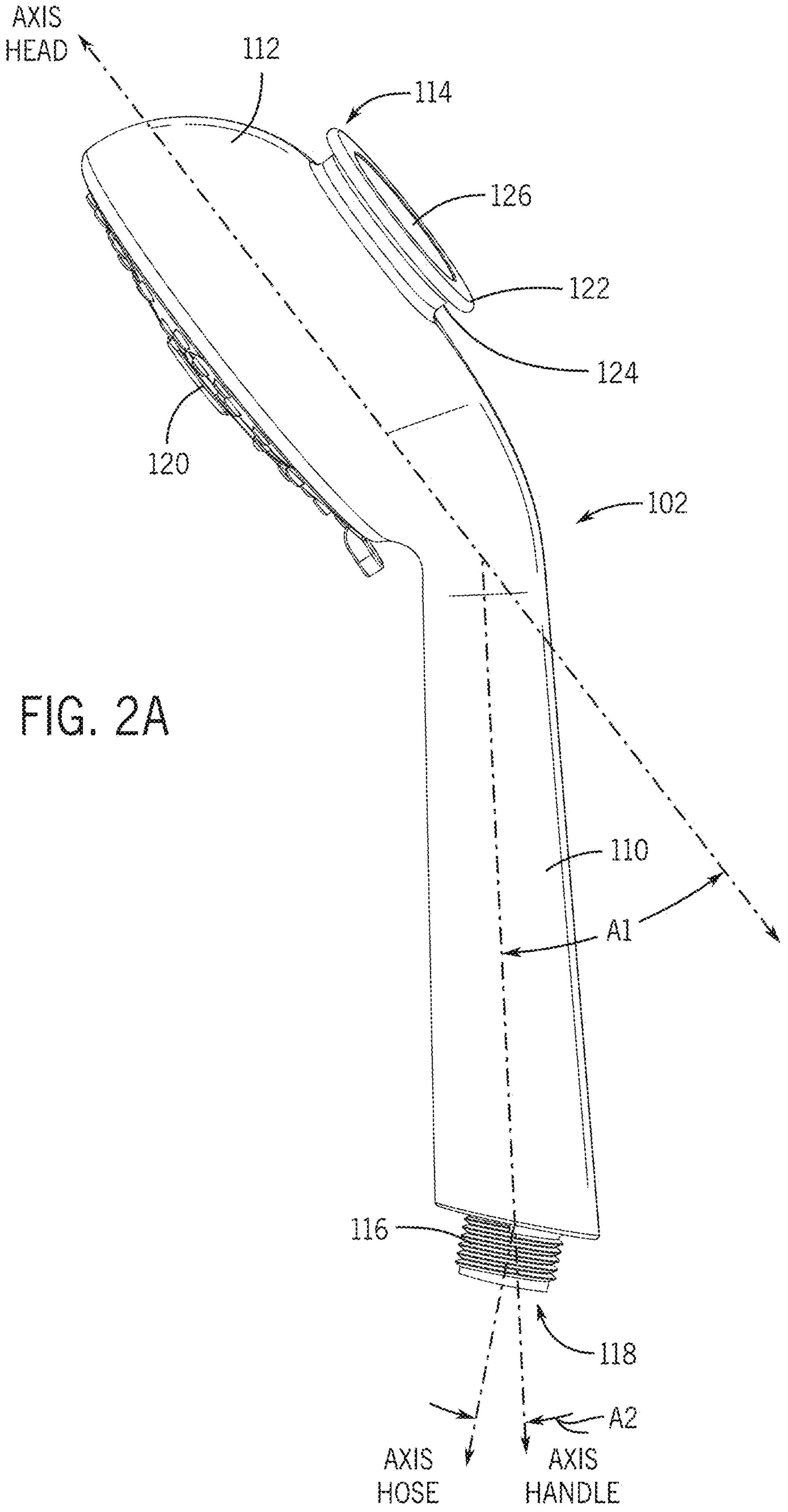
FIG. 2A is a side elevation view of a showerhead in accordance with an embodiment of the disclosure.
Figure 2B:
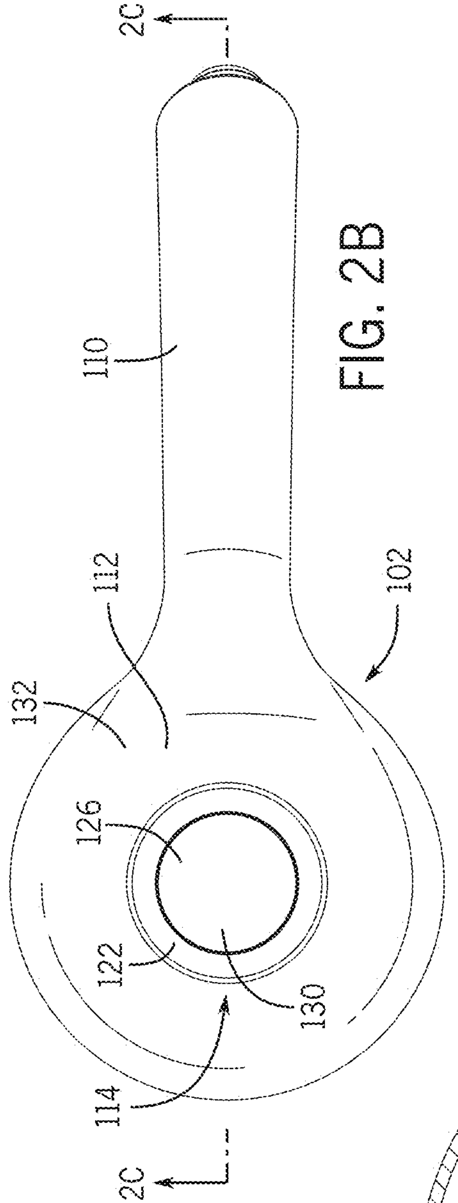
FIG. 2B is a plan view of a back of a showerhead in accordance with an embodiment of the disclosure.
Figure 2C:
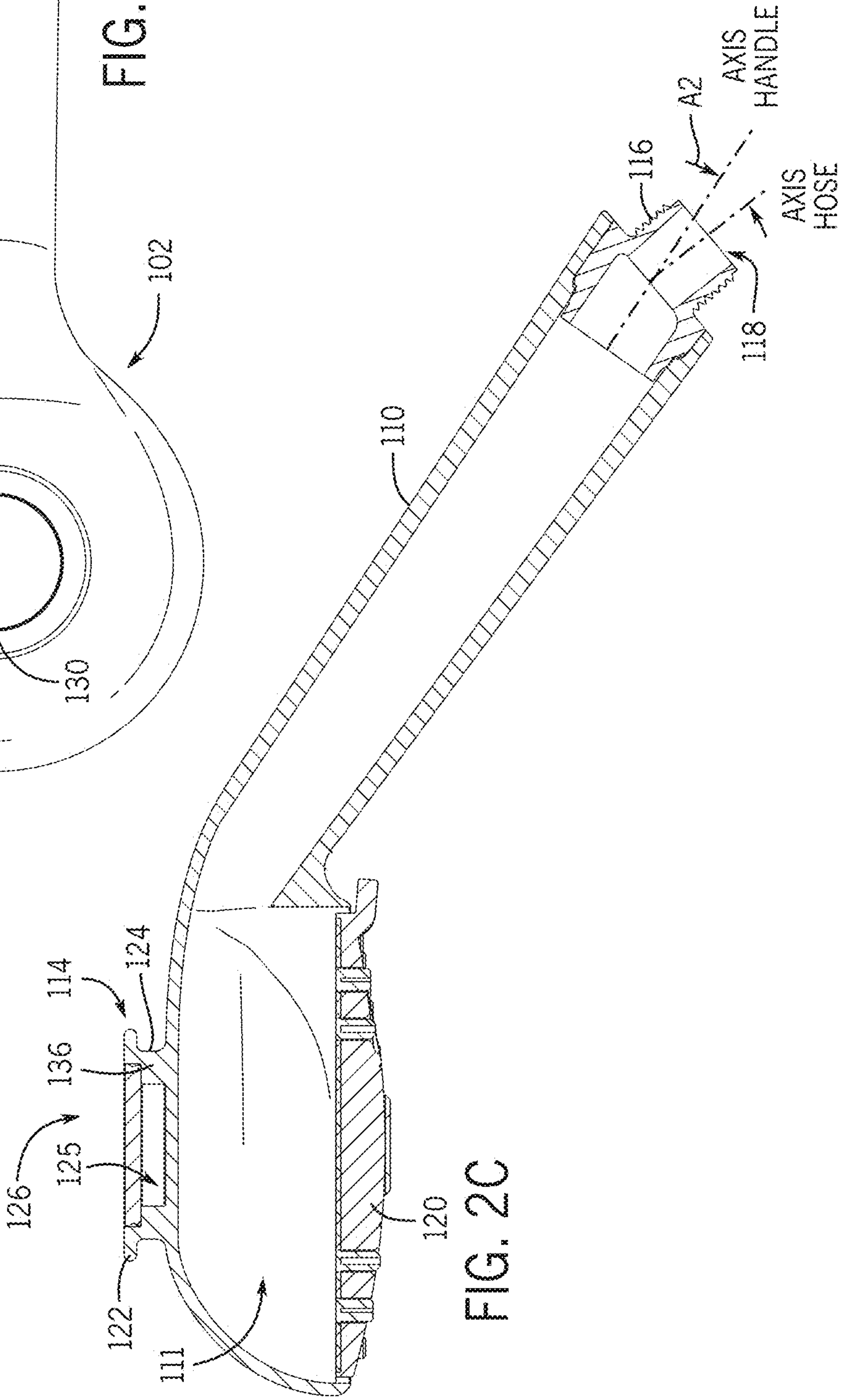
FIG. 2C is a cross-section view of the showerhead taken along line 2C-2C in FIG. 2B in accordance with an embodiment of the disclosure.

With reference to FIGS. 2A-2C, the showerhead 102 may include a handle 110 and head 112 extending from the handle 110. The head 112 may define a rounded body for the showerhead 102 and may have a longitudinal axis $\text{Axis}_{HEAD}$ that extends along a length of the head 112 (see FIG. 2A). The head 112 expands outwards from the top end of the handle 110 and may define an engine compartment 111 configured to receive a showerhead engine (not shown) therein that generates different spray patterns, e.g., modes. The head 112 may include a back or rear surface 132 that forms a back of the showerhead 102. A spray face 120 may be positioned opposite the rear surface 132 and may be formed with or coupled to the head 112. The spray face 120 may include a plurality of nozzles through which water is output. The spray face 120 may be part of an engine (not shown) received within the head 112 or separate therefrom.

The handle 110 may define an elongated body extending from a rear of the head 112 that includes an inlet 118 at a bottom end and is fluidly coupled to the head 112 at the top end. The handle 110 may include a length and a longitudinal axis $\text{Axis}_{HANDLE}$. In some embodiments, the longitudinal axis $\text{Axis}_{HANDLE}$ of the handle 110 may be offset from the head 112 by an angle A1. The angle A1 may be selected based on a desired spray area for the showerhead 102 when positioned in at least one position of the showerhead 102 on the mounting bracket 104. In some embodiments, the angle A1 is selected to be larger than 15 degrees, such as between 15 to 80 degrees, and in many instances between 30 to 40 degrees, such as 35 degrees.

Optionally, a bottom end of the handle 110 may be configured to couple to the hose 108 and may include a hose coupling portion 116, which may include threads or other coupling elements. The hose coupling portion 116 may be formed integrally with the handle 110 or may be a separate element, such as an insert, received therein. In some embodiments, the hose coupling portion 116 may extend at an angle from the longitudinal axis $\text{Axis}_{HANDLE}$, for example, the hose coupling portion 116 may have a longitudinal axis $\text{Axis}_{HOSE}$ oriented at an angle A2 relative to the handle longitudinal axis $\text{Axis}_{HANDLE}$ In one embodiment, the angle A2 may be an acute angle, such as between 5 to 30 degrees and in some instances 15 degrees. In one example, the hose coupling portion 116 may support at least a portion of a mounting feature 115 (see FIG. 1A) for the showerhead 102.

With reference to FIGS. 2B and 2C, a mounting element 114 may be coupled to the head 112 of the showerhead 102.

In one example, the mounting element 114 may be formed with the head 112 and extend from the rear surface 132 of the head 112. The mounting element 114 is configured to mechanically secure the showerhead 102 on the mounting bracket 104. The mounting element 114 may include a boss 124 that extends rearwards from a center of the rear surface 132 and a flange 122 coupled to the end of the boss 124. The flange 122 may extend radially outward from the boss 124 and have a larger diameter than the boss 124 to define an annular recess between the flange 122 and the back surface 132 of the head 112. The boss 124 may be hollow. The boss 124 may define a support ledge 136 on an interior surface thereof. The support ledge 136 may extend radially inwards towards a center axis of the boss 124.

The showerhead 102 may also include a feedback element 126, which may define a first feedback element for the showerhead assembly 100. The feedback element 126 may be a magnet or magnetically attractable material (e.g., metal, metal alloys, etc.). In one example, the feedback element 126 is a stainless steel plate configured to interact with a magnetic force. The feedback element 126 may be exposed on the showerhead 102 (see FIG. 2B), or may be recessed or positioned behind a portion of the housing of the head 112.

With reference to FIG. 2B, the feedback element 126 may be positioned on the support ledge 136 of the boss 124 and secured in position. The feedback element 126 may form a back surface or engagement surface 130 for the showerhead 102. In some embodiments, the feedback element 126 may be flush with the top surface of the flange 122, which may allow a seamless mounting of the showerhead 102 on the bracket 104. In other examples, the feedback element 126 may be recessed from the top surface of the flange 122 and may be covered or partially covered by a back cap or cover. This may be useful in instances where an aesthetic element, such as a finish, paint, or the like, may not adhere to the material forming the feedback element 126. As shown in FIG. 2C, the feedback element 126 may enclose the cavity 125 within the boss 124.

Figure 3A:
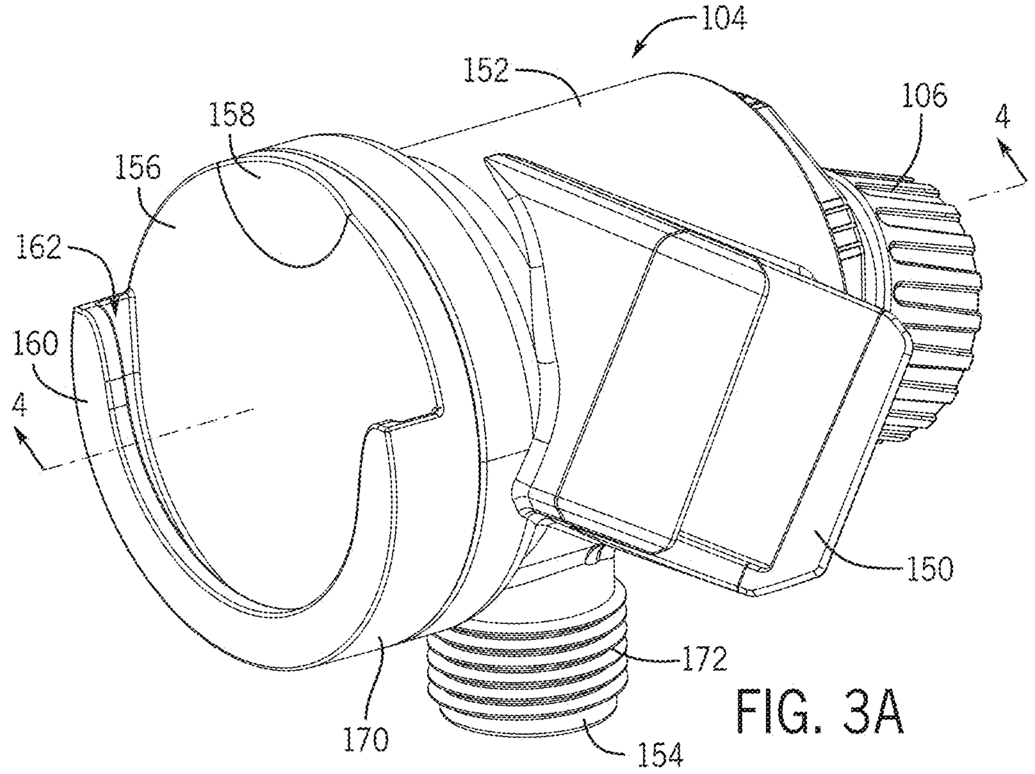
FIG. 3A is a front isometric view of a mounting bracket in accordance with an embodiment of the disclosure.
Figure 3B:
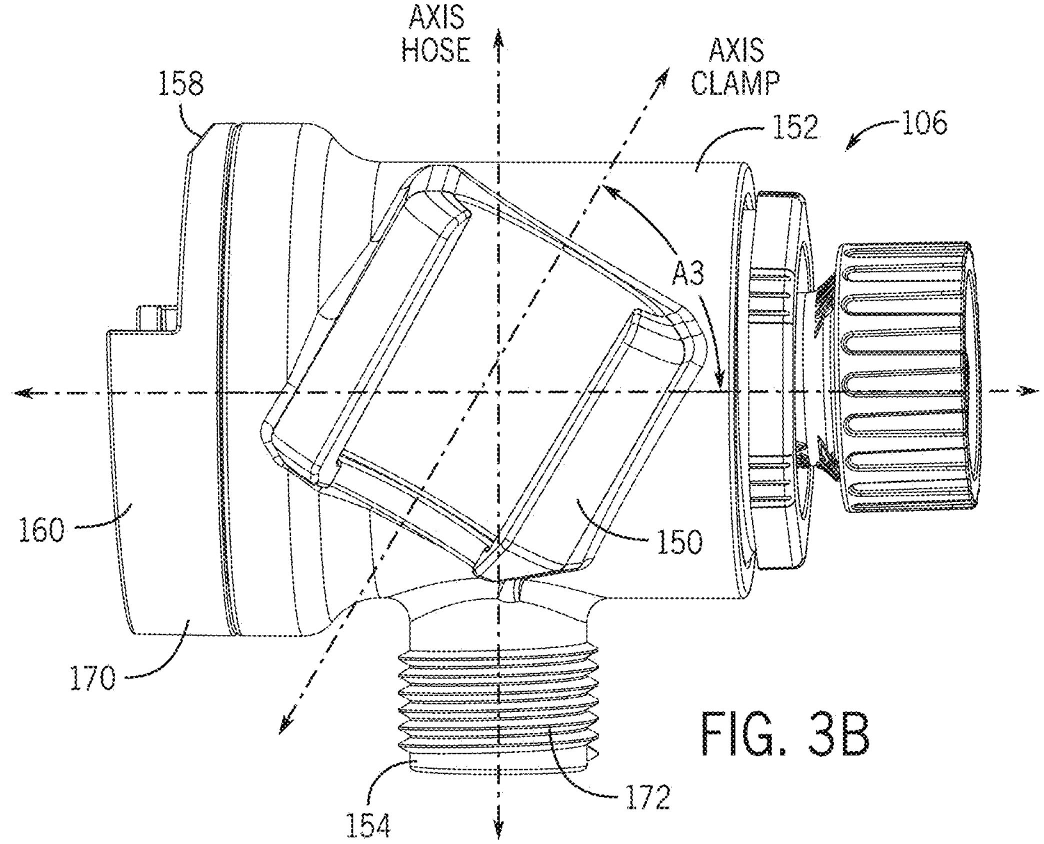
FIG. 3B is a side elevation view of a mounting bracket in accordance with an embodiment of the disclosure.
Figure 4:
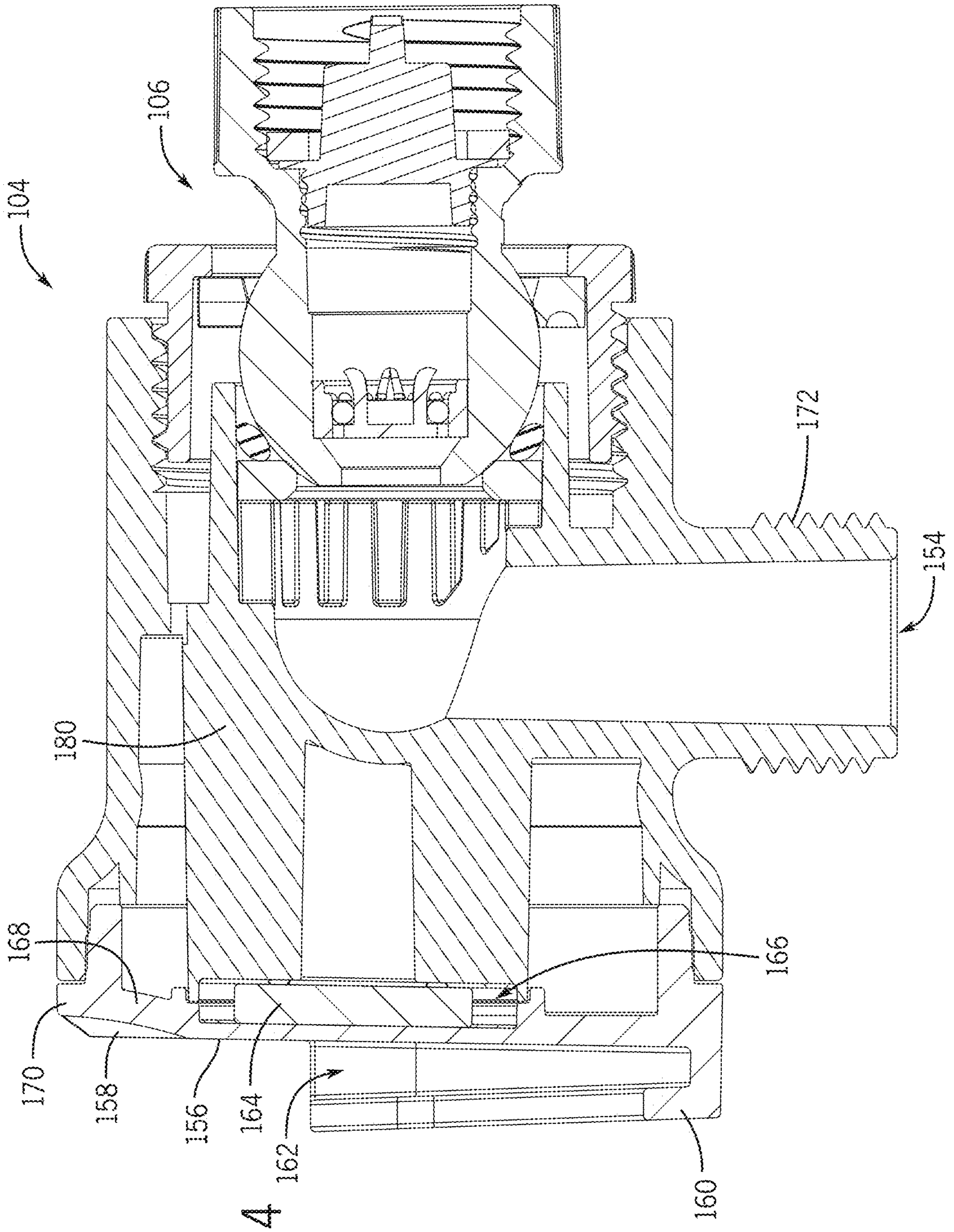
FIG. 4 is a cross-section view of a mounting bracket taken along line 4-4 in FIG. 3A in accordance with an embodiment of the disclosure.

FIGS. 3A-4 illustrate various views of the mounting bracket 104. The mounting bracket 104 is configured to support the showerhead 102 within an environment, such as a shower. In some embodiments, the mounting bracket 104 may be configured to provide feedback to a user as the showerhead 102 is mounted thereon, such as when mounted in a first position. The mounting bracket 104 may include a pivot ball assembly 106 that couples the mounting bracket 104 to the water outlet 105. Optionally, the pivot ball assembly 106 may allow the mounting bracket 104 to be repositionable relative to the water outlet 105. The pivot ball assembly 106 may also include filters, water flow regulators, or the like, depending on the desired function and features of the showerhead assembly 100.

The mounting bracket 104 may include a bracket body 152 fluidly coupled to the water outlet 105. A hose port 154 may extend downwards from a bottom surface of the bracket body 152 and be fluidly coupled to the water outlet 105, e.g., be fluidly coupled to an interior of the bracket body 152 that connects to the water outlet 105. The hose port 154 may optionally include a hose coupling feature 172, such as threading, that couples the hose 108 to the mounting bracket 104.

A mounting feature 150 may be coupled to bracket body 152, for example, the mounting feature 150 may extend from a sidewall of the bracket body 152. In one example, the mounting feature 150 may be a C-clamp that defines a slot for receiving a portion of the showerhead 102 to secure it to the mounting bracket 104. In some embodiments, the orientation of the mounting feature 150 relative to the bracket body 152 may be selected to enhance a spray area of the showerhead 102 when the showerhead 102 is mounted in the mounting feature 150 such as to allow a user to full experience spray from the showerhead in both orientations. For example, the mounting feature 150 may have a longitudinal axis $Axis_{CLAMP}$ offset from a normal axis to a longitudinal axis $Axis_{BRACKET}$ of the bracket 104. In other words, rather than being perpendicular to the $Axis_{BRACKET}$, the $Axis_{CLAMP}$ may be oriented at an angle less than 90 degrees, e.g., between 80 to 10 degrees. In some embodiments, $Axis_{CLAMP}$ is oriented at an angle A3 relative to the $Axis_{BRACKET}$, such as an angle of 70 degrees. However, in other embodiments, the angle A3 may be in different configurations and may be based on a geometry of the handle 110 and showerhead 102.

With continued reference to FIGS. 3A-4, the mounting bracket 104 may include a front cap 170 that defines a front face or front end of the mounting bracket 104. The front cap 170 may be coupled to the bracket body 152 and may define a connection face 156. The connection face 156 may be a relatively planar surface that is configured to engage a portion of the showerhead 102. A recess 158 may be defined on a top end of the connection face 156, which may extend downwards from a top end of the connection face 156. The recess 158 may have a tapered depth so as to define a beveled edge at the top end of the connection face 156. The recess 158 may be positioned and sized so as to assist a user in navigating the showerhead 102 along the connection face 156 in a smooth manner. In some embodiments, the thickness of the connection face 156 may be selected to allow an attractive force, such as a magnetic force, to travel therethrough. In these embodiments the thickness of the connection face 156 may be varied based on the size of the feedback elements or the like.

A second mounting feature 160 may be defined as an arcuate upwardly facing lip extending from a bottom edge of the connecting face 156. The second mounting feature 160 may be spaced apart from the connection face 156 so as to define a mounting recess 162 therebetween. In this manner, the second mounting feature 160 may be defined as a ledge that can mechanically support the showerhead 102. In some embodiments, the mounting recess 162 may have a varied width as it extends around a portion of the perimeter of the connecting face 156, e.g., the second mounting feature 160 may not be parallel to the connecting face 156. In one example, the mounting recess 162 may have a depth that tapers towards a center of the mounting recess 162. In this example, a middle portion of the second mounting feature 160, such as one corresponding to a bottom most portion of the second mounting feature 160, may have the narrowest mounting recess 162. These embodiments may define a "V" type depth, helping to encourage the showerhead 102 into the centered position on the second mounting feature 160.

The second mounting feature 160 may be oriented at a different location, e.g., front face, of the mounting bracket 104 relative to the first mounting feature 150, allowing the mounting bracket 104 to support the showerhead 102 in at least two separate positions.

Figure 5:
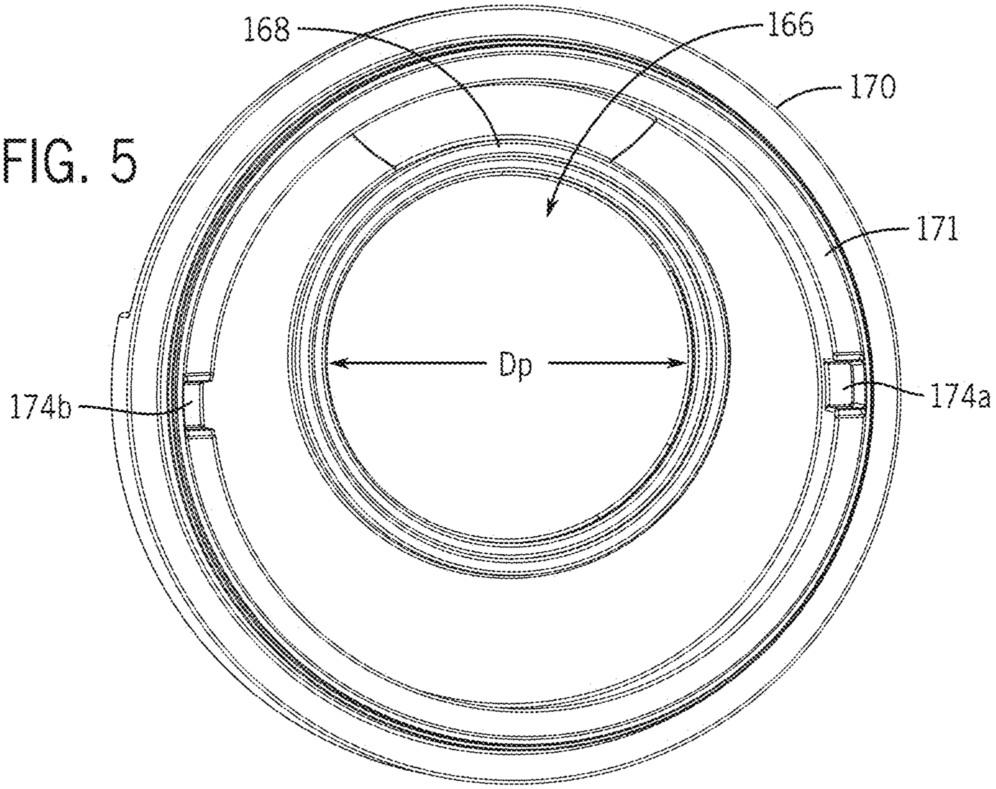
FIG. 5 is a rear elevation view of a front cap in accordance with an embodiment of the disclosure.

With reference to FIG. 5, in one embodiment, an interior surface of the front cap 170 includes an impact wall 168 that extends therefrom. The impact wall 168 may extend so as to define a feedback pocket 166. The impact wall 168 may be arranged in a circle to define a circular shaped feedback pocket 166 and may have a diameter Dp. The diameter Dp may be selected to be larger in at least one dimension than the feedback element 164. In other embodiments, the impact wall 168 may be configured to define a rectangular or vertical slot for the feedback pocket 166, e.g., as parallel walls.

Optionally, the front cap 170 may also include an engagement wall 171 that extends around the interior face of the front cap 170. The engagement wall 171 may assist in coupling the front cap 170 to the bracket body 152 and to that end may include one or more keying features 174*a*, 174*b*, such as tabs or recesses, that engage with corresponding features on the bracket body 152 to secure the front cap 170 thereto.

With reference to FIG. 4, the feedback element 164 may be coupled to the bracket body 152, such as via the front cap 170. The feedback element 164 may be a magnet or a magnetic material (such as one that interfaces with or exerts a magnetic force) and may be formed as a mass, such as a disc or other element. In this manner, the feedback element 164 may be defined as a movable mass. As mentioned above, in some embodiments, the feedback element 164 may have a diameter that is smaller in at least one dimension as compared to the dimension so of the feedback pocket 166, allowing the feedback element 164 to move within the feedback pocket 166.

With reference to FIG. 4, to assemble the mounting bracket 104, the optional pivot ball assembly 106 may be coupled to a back open end of the bracket body 152. For example, the pivot ball assembly 106 (which may include optional flow restrictors and/or filters) may be threaded onto the back end of the bracket body 152. The feedback element 164 may be positioned within the feedback pocket 166 of the front cap 170. The front cap 170 may then be secured to the front end of the bracket body 152. For example, the keying features 174*a*, 174*b* may engage with corresponding features on the bracket body 152 and the engagement wall 171 may be positioned within an outer wall of the bracket body 152. The front cap 170 may be positioned such that the bracket body 152 is sufficiently spaced apart from the feedback pocket 166 to allow the feedback element 164 to move within the feedback pocket 166, but also to prevent the feedback element 164 from falling out of the feedback pocket 166. For example, a support 180 within the bracket body 152 may be positioned behind the feedback element 164 and help maintain the feedback element 164 within the feedback pocket 166.

In a shower environment, the mounting bracket 104 may be coupled to the water outlet 105. For example, the pivot ball assembly 106 may be coupled to the end of the water outlet 105, which fluid and mechanically couples the mounting bracket 104 to the water outlet 105 and the support 107. The hose 108 may be coupled to the hose port 154 of the mounting bracket 104, such as via threading, and the hose 108 may then be fluidly coupled to the water outlet 105 via the bracket body 152. The other end of the hose 108 may then be coupled to the showerhead 102, such as via hose coupling portion 116, e.g., the hose 108 may be screwed onto threads of the coupling portion 116. In some embodiments, the hose 108 may include a handle coupling portion 182 that fits over the hose coupling portion 116 and may either with the hose coupling portion 116 or separately from the hose coupling portion 116 may define the mounting feature 115 for the showerhead 102, e.g., may allow the showerhead 102 to be supported on the mounting bracket 104 such as via the mounting feature 150. The hose 108 fluidly couples the showerhead 102 to both the mounting bracket 104 and the water outlet 105.

The showerhead 102 may then be mounted to the mounting bracket 104. In one example, as shown in FIG. 1B, the showerhead 102 may be mounted in a high position, such as a second position, relative to the mounting bracket 104, such as via first mounting feature 150. For example, the user may position the showerhead 102 such that the showerhead mounting feature 115 is oriented above the top end of the mounting feature 150 of the mounting bracket 104 and then may slide the showerhead 102 downward such that the showerhead mounting feature 115 is seated in the mounting feature 150. In embodiments where the mounting feature 150 is a clamp, the clamp partially surrounds the handle coupling portion 182 and/or hose coupling portion 116. In these embodiments, the bottom wall of the handle 110 may sit on the top surface of the mounting feature 150 or be positioned just above the top surface. In this configuration, the angled orientation of the mounting feature 150 and the angled orientation (angle A1) of the handle 110 relative to the head 112, allows the showerhead 102 to be positioned such that the spray face 120 faces downward towards a user (rather than upwards) and allows the mounting bracket 104 to be rotated around the pivot ball assembly 106 without the showerhead 102 hitting the support 107. In the first position, the user can use the showerhead 102, with the showerhead 102 being supported on the support 107 via the mounting bracket 104 and fluidly connected to the water outlet 105 via the hose 108. The user can also use the showerhead 102 when decoupled or removed from the mounting bracket 104, e.g., when undocked from the mounting bracket 104.

Figure 6:
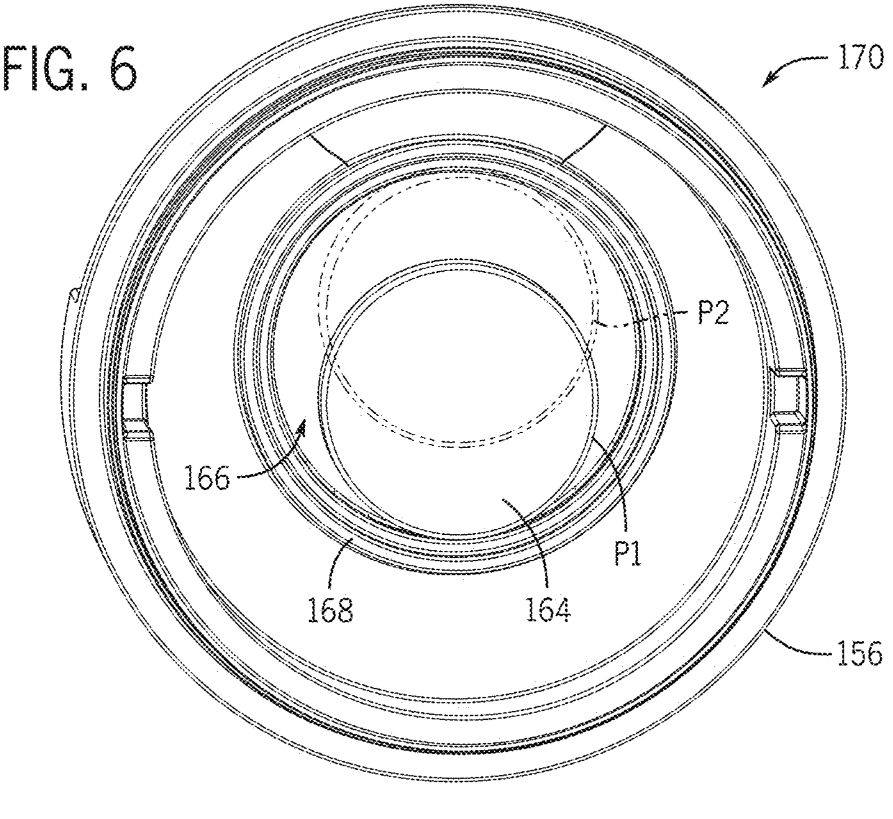
FIG. 6 is a rear elevation view of a front cap and feedback element in accordance with an embodiment of the disclosure.

The showerhead 102 may also be mounted in a low or first position on the mounting bracket 104 either for hands-free showering or for storage. With reference to FIG. 1A, to position the showerhead 102 on the mounting bracket 104 in the first position, which may be lower than the second position, the user moves the showerhead 102 towards the front cap 170 of the mounting bracket 104 and raises the head 112 above the connection face 156. As the head 112 approaches the connecting faces 156, the recess 158 allows the user to easily slide the head 112 into position adjacent the connection face 156. The feedback element 126 in the showerhead 102 interacts with the feedback element 164 in the mounting bracket 104, e.g., the magnetic force generated by the feedback element 164 acts to pull the two feedback elements 126, 164 closer to one another. This attractive force, causes the feedback element 164 in the mounting bracket 104 to move. Specifically and with reference to FIG. 6, the attractive force, causes the feedback element 164 to move vertically within the feedback pocket 166 into position P2 from position P1. As the feedback element 164 moves it impacts the interior surface of the top edge of the impact wall 168. This impact generates a sound, such as a "click." The click provides feedback to the user that the showerhead 102 is aligned with the connection face 156 and the bracket body 152 to connect the showerhead 102 to the mounting bracket 104. The generation of the audible feedback may be based on a select distance of the showerhead 102 relative to the mounting bracket 104, such as by changing the strength of a magnetic interaction between the feedback elements and/or adding or removing additional layers (e.g., walls) that may attenuate the strength. It should be noted that in other embodiments, the movable feedback element may be positioned within the showerhead and the stationary feedback element may be positioned within the bracket.

The user then continues to move the showerhead 102 towards the connection face 156 and vertically downwards. The mount assembly 114 acts to engage with the mounting feature 160 on the front face of the mounting bracket 104. For example, the engagement surface 130 is aligned to be parallel to the connection face 156 and the flange 122 sits within the mounting recess 162. The recess 158 on the connection face 156 helps to prevent the showerhead 102 from becoming caught on the top surface of the bracket body 152 and more easily slide into a position parallel with the connection face 156. As the user navigates the showerhead 102 into the mounting engagement, the feedback element 164 within the feedback pocket 166 moves in a controlled manner, with the movement of the head 112. As such, the feedback element 164 may not rapidly increase in speed downward when returning to the first position P1 and so may not make an audible click as it engages against the bottom surface of the impact wall 168 or the sound generated may not be as loud as the feedback click. However, in other embodiments, the feedback element 164 may be configured to generate an audible click in both the alignment and mounted configurations, e.g., the mass of the feedback element 164 may be increased to generate a louder sound at impact.

The mounting feature 160 then supports the weight of the showerhead 102 via the engagement of the flange 122 and the mounting feature 160. For example, when the mounting feature 160 is a lip, the flange 122 sits in the mounting recess 162 with the lip being positioned between the enclosed portion of the flange 122 and the rear surface 132 of the head 112. The mechanical interaction between the mounting feature 160 and the mounting assembly 114 supports the full weight of the showerhead 102 (and optionally the hose 108 and any forces due to water pressure). Until the showerhead 102 is positioned in the mounting bracket 104 such that the mounting feature 160 engages the mounting assembly 114, the mounting bracket 104 may be unable to support the weight of the showerhead 102. In other words, the attractive force exerted between the two feedback elements 126, 164 may be insufficient or too weak to support the weight of the showerhead 102. In these configurations, this may allow a user to more easily remove the showerhead 102 from the mounting bracket 104, i.e., the attractive force may not be so large as to hinder a user's ability to life the showerhead 102 out of the mounting bracket 104.

In some embodiments, the showerhead 102 may also be rotated relative to mounting bracket 104 while remaining coupled to mounting feature 160. For example, in instances where the mounting feature 160 is an upwardly facing lip, the flange 122 may move along an arc within the mounting recess 162 and remain coupled to the mounting bracket 104. Additionally, in instances where the mounting recess 162 may have a tapered depth, the shape of the mounting recess 162 may encourage the showerhead 102 to settle into the middle portion thereof, after rotation, aligning the showerhead 102 on the mounting bracket 104. This may allow a user to rotate the showerhead 102, without removing the showerhead 102 from the bracket 104, such as to reach something behind the showerhead 102 (e.g., shampoo on the support 107 on a showerhead caddy), and the showerhead 102 will settle back into the aligned position. This rotational connection may also allow the user to reposition the showerhead 102 as the mounting bracket 104 is repositioned relative to the water outlet 105.

In the first or low mounting position, the angular alignment of the head 112 relative to the handle 1110, e.g., angle A1, allows the spray face 120 to be positioned to impact the user in the showerhead environment, allowing the spray to full wet or impact the user, even as the mounting bracket 104 is pivoted on the water outlet 105.

All relative and directional references (including top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A showerhead assembly comprising:

a handheld showerhead; and a mounting bracket configured to be fluidly coupled to a water source;

wherein one of the handheld showerhead and the mounting bracket includes a magnet, and the other of the handheld showerhead and the mounting bracket includes a magnet or a magnetically attractable material;

wherein the magnet of the one of the handheld showerhead or the mounting bracket, or the magnet or the magnetically attractable material of the other of the handheld showerhead or the mounting bracket, moves, during normal use of the showerhead assembly, relative to the handheld showerhead or the mounting bracket to which it is included by attraction of the magnet of the one of the handheld showerhead and the mounting bracket to the magnet or the magnetically attractable material of the other of the handheld showerhead and the mounting bracket.

2. The showerhead assembly of claim 1, wherein the moveable magnet or magnetically attractable material is configured to move between a first position and a second position relative to the handheld showerhead or the mounting bracket to which it is included.

3. The showerhead assembly of claim 2, wherein an audible feedback is generated as the moveable magnet or magnetically attractable material moves to the second position.

4. The showerhead assembly of claim 2, further comprising an impact wall at least partially surrounding the moveable magnet or magnetically attractable material to limit movement of the moveable magnet or magnetically attractable material, wherein an audible noise is generated as the moveable magnet or magnetically attractable material contacts the impact wall in response to attraction of the magnet of the one of the handheld showerhead and the mounting bracket to the magnet or the magnetically attractable material of the other of the handheld showerhead and the mounting bracket.

5. The showerhead assembly of claim 1, wherein the moveable magnet or magnetically attractable material is positioned within the mounting bracket.

6. The showerhead assembly of claim 5, wherein the mounting bracket includes a bracket body and a front cap coupled to a front end of the bracket body, and wherein the moveable magnet or magnetically attractable material is positioned within a pocket defined in the front cap.

7. The showerhead assembly of claim 1, wherein the handheld showerhead includes a circular disc coupled to and offset from a rear surface of the handheld showerhead, and wherein one of the magnet or the magnetically attractable material is positioned within the disc.

8. The showerhead assembly of claim 1, wherein the attraction of the magnet of the one of the handheld showerhead and the mounting bracket to the magnet or the magnetically attractable material of the other of the handheld showerhead and the mounting bracket is insufficient to retain the handheld showerhead to the mounting bracket.

9. The showerhead assembly of claim 1, wherein the mounting bracket further comprises an arcuate ledge extending from a front surface of the mounting bracket.

10. The showerhead assembly of claim 9, wherein the showerhead is rotatable within the arcuate ledge while remaining mounted on the mounting bracket.

11. The showerhead assembly of claim 9, wherein the showerhead further comprises a flange offset from a rear surface of the showerhead and configured to mechanically engage with the arcuate ledge to mount the showerhead to the mounting bracket.

12. A showering system comprising:

a handheld showerhead including a mounting feature and a showerhead feedback element; and a mounting bracket configured to support the handheld showerhead and comprising a bracket feedback element, wherein the showerhead feedback element interacts with the bracket feedback element at a select distance and orientation to generate an audible feedback, and wherein the showerhead feedback element or the bracket feedback element moves, during normal use of the showering system, relative to the handheld showerhead or the mounting bracket to which it is included.

13. The showering system of claim 12, wherein the audible feedback is produced by the bracket feedback element impacting a portion of the mounting bracket.

14. The showering system of claim 12, the showerhead feedback element and bracket feedback element interact to generate an attractive force pulling the handheld showerhead towards the mounting bracket.

15. The showering system of claim 14, wherein the attractive force is insufficient to support the handheld showerhead on the mounting bracket.

16. The showering system of claim 12, wherein the mounting bracket further comprises a mounting feature that engages a portion of the handheld showerhead to support the handheld showerhead on the mounting bracket.

17. The showering system of claim 16, wherein the mounting feature comprises:

a first mounting feature that supports the handheld showerhead at a first location; and a second mounting feature that supports the handheld showerhead a second location.

18. A showerhead assembly comprising:

a showerhead comprising a showerhead mounting assembly;

a mounting bracket comprising a bracket mounting assembly configured to be coupled to a support structure; and a magnet or magnetically attractable material included in the showerhead or the mounting bracket, wherein:

the magnet or magnetically attractable material moves, during normal use of the showerhead assembly, relative to the showerhead or the mounting bracket to which it is included;

the showerhead mounting assembly engages the bracket mounting assembly to support the showerhead in two different positions relative to the bracket; and the showerhead mounting assembly and the bracket mounting assembly are configured to define a spray area sufficiently spaced apart from the support structure to allow a user to be full wetted by a spray of the showerhead in both of the two positions.

19. The showerhead assembly of claim 18, wherein the showerhead further comprises a handle portion and a head portion and an angle between a center axis of the head portion and a center axis of the handle portion is larger than 15 degrees.

20. The showerhead of claim 18, wherein the showerhead further comprises a handle portion and a head portion and the mounting assembly comprises a hose mount, wherein the house mount is configured be supported on the mounting bracket in a first position of the showerhead and the house mount is positioned off axis from a center axis of the handle portion.

21. A showering system comprising:

a handheld showerhead including a mounting feature and a showerhead feedback element; and a mounting bracket configured to support the handheld showerhead and comprising a bracket feedback element, wherein the showerhead feedback element interacts with the bracket feedback element at a select distance and orientation to generate an audible feedback, and wherein the audible feedback is produced by the bracket feedback element impacting a portion of the mounting bracket.

* * * * *